(12) United States Patent
Nosaka et al.

(10) Patent No.: US 7,507,159 B2
(45) Date of Patent: Mar. 24, 2009

(54) POWER TRANSMISSION APPARATUS

(75) Inventors: Michiyasu Nosaka, Anjo (JP); Yasuo Tabuchi, Toyoake (JP); Motohiko Ueda, Okazaki (JP); Yoshiki Tada, Okazaki (JP)

(73) Assignee: DENSO CORPORATION, Kariya (JP)

( * ) Notice: Subject to any disclaimer, the term of this patent is extended or adjusted under 35 U.S.C. 154(b) by 467 days.

(21) Appl. No.: 11/367,318

(22) Filed: Mar. 6, 2006

(65) Prior Publication Data
US 2006/0229131 A1  Oct. 12, 2006

(30) Foreign Application Priority Data
Apr. 8, 2005  (JP) .............................. 2005-112188

(51) Int. Cl.
*F16D 9/00* (2006.01)
(52) U.S. Cl. .............................. 464/32; 464/90; 464/30
(58) Field of Classification Search .................. 464/30, 464/32, 89, 90
See application file for complete search history.

(56) References Cited

U.S. PATENT DOCUMENTS

2003/0130044 A1   7/2003   Kanai et al.

2006/0217203 A1 *  9/2006  Nosaka et al. ................ 464/30

FOREIGN PATENT DOCUMENTS

| JP | 2001-173759 |   | 6/2001 |
|----|-------------|---|--------|
| JP | 2003-206950 | A | 7/2003 |
| JP | 2004263831  | A * | 9/2004 |

* cited by examiner

*Primary Examiner*—Aaron M Dunwoody
(74) *Attorney, Agent, or Firm*—Posz Law Group, PLC

(57) ABSTRACT

A power transmission apparatus (10) includes a rotary portion (1) to which turning driving force from a driving source is transmitted and which can rotate, a power cutoff member (3) mechanically connected to the rotary portion (1) and one of the ends of a rotary shaft (5) of a driven apparatus and cutting off transmission of excessive torque between them, and a cap (4) connected to the end of the rotary shaft (5) on one hand and fastened by screw meshing to the power cutoff member (3) on the other hand, and transmitting power from the power cutoff member (3) to the rotary shaft (5). The rotary portion (1), the power cutoff member (3), the cap (4) and the rotary shaft (5) all rotate integrally with one another. The cap (4) has a flange portion (4h) protruding in a radial direction with respect to an axis of the rotary shaft (5) and supporting an axial force.

8 Claims, 5 Drawing Sheets

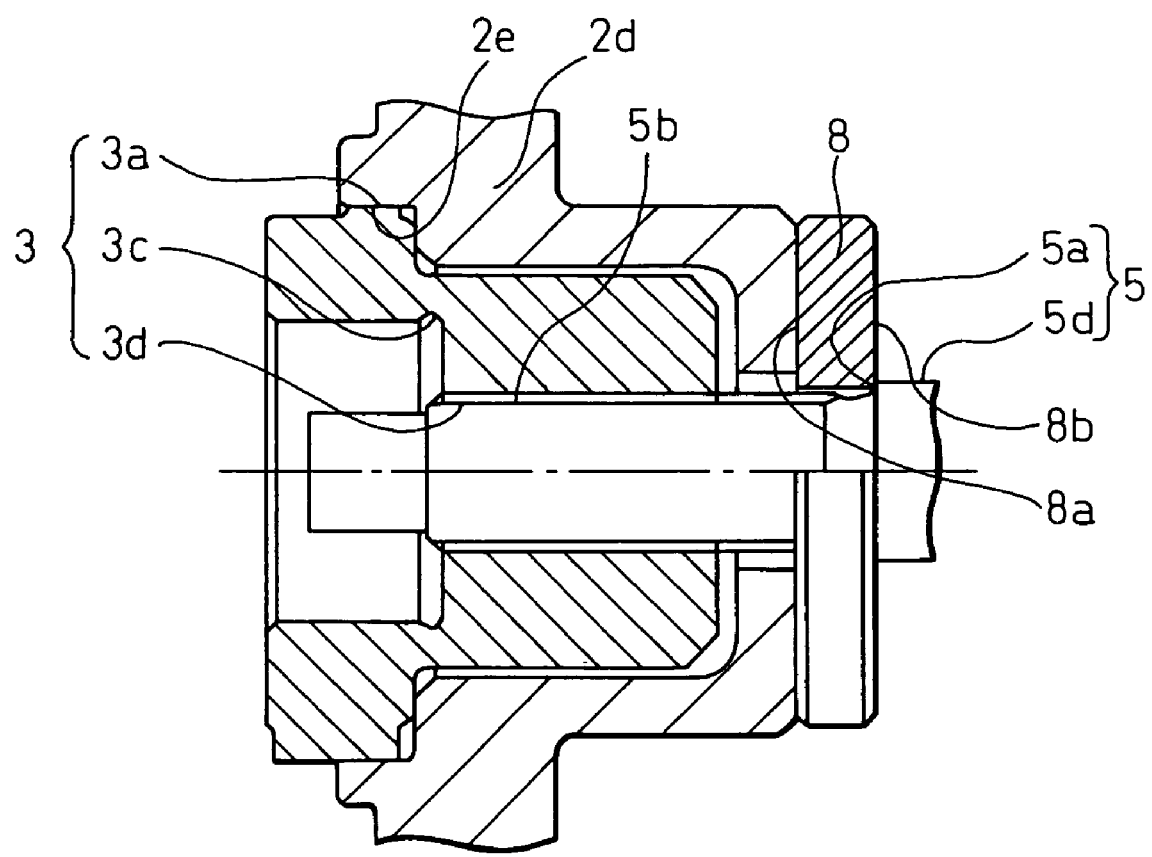

POWER TRANSMISSION APPARATUS

BACKGROUND OF THE INVENTION

1. Field of the Invention

This invention relates to a power transmission apparatus. More particularly, the invention is suitably used while being assembled in a compressor of a car air conditioner and operated from an external power source, such as an engine, through a belt.

2. Description of the Related Art

A refrigerant compressor of a car air conditioner is driven from an external power source such as an engine through a belt and a pulley. To cut off connection between the engine and the compressor, an electromagnetic clutch may be interposed between them. However, the electromagnetic clutch is not interposed in many cases because the production cost can be decreased when an electromagnetic clutch is not disposed. In this case, a torque limiter (power cutoff member) is disposed in the power transmission apparatus of the compressor for the car air conditioner operated through the belt to avoid disadvantage such as belt damage when the compressor seizes.

The torque limiter uses screw meshing for a part of a power transmission route and utilizes an excessive axial force that occurs at the screw meshing portion, owing to the excessive torque when the compressor seizes (refer to Japanese Unexamined Patent Publication No. 2003-206950, for example). Because this torque limiter system utilizes friction for cutoff, however, it involves the problem that the operation torque of the torque limiter changes with the passage of time because the coefficient of friction changes due to corrosion of the friction surface, as a contact surface, and the adhesion of grease.

In the power transmission apparatuses of the prior art such as the one described above, another torque limiter is known with sealing the friction surface and which avoids the problem described above. The power transmission apparatus of this type has a structure in which a part of the power transmission portion has screw coupling. The torque limiter system utilizing this screw coupling breaks a part of the power transmission route and cuts off the power transmission route by utilizing an excessive axial force occurring at the screw coupling portion by the excessive torque that occurs when the compressor seizes.

The requirement for reducing the power losses of the compressor and the power transmission apparatus are high at present. A technology of reducing a diameter of a shaft is known to reduce the loss of a shaft seal device and a bearing as a sliding loss of a shaft of a compressor. In the power transmission apparatus of the prior art having the torque limiter described above, the reduction of the diameter of a rotary shaft on the output side invites another problem. When the diameter of the rotary shaft is decreased in the fastening structure between a hub and the compressor of the power transmission apparatus of the prior art for transmitting power to the compressor, the problem occurs in that the torque limiter mechanism does not operate.

FIG. 5 is a partial sectional side view of an embodiment of the fastening structure of the prior art. In the case of the power transmission apparatus 50 for fastening the rotary shaft 5 of the compressor having a slide portion 5d with the shaft seal device having a relatively large outer diameter, seat faces (bearing surfaces) 8a and 8b of a washer 8 sufficient for power transmission can be arranged. The power cutoff member 3 is fastened at its screw portion 3d to the rotary shaft 5 and the hub 2 mechanically fitted is coupled or meshed with the power cutoff member 3. It can be appreciated from FIG. 5 in this construction that a support surface having a sufficient area for the axial force generated as the torque transmitted from the pulley is converted can be formed on the seat faces 8a and 8b of the washer 8 and on the seat face (bearing surface) 5a of the rotary shaft 5. Therefore, the surface pressure acting on the seat faces 8a and 8b and the seat face 5a can be limited to a low level.

FIG. 6 shows the power transmission apparatus 60 when the fastening structure shown in FIG. 5 is extended to a rotary shaft having a small diameter. FIG. 7 is an enlarged view of the fastening portion in FIG. 6. The area of the seat face 5a of the rotary shaft 5 becomes small, the axial force supporting area of the seat faces 8a and 8b (particularly 8b) of the washer 8 becomes small, and a high torque occurs in the screw fastening direction in the screw portion 3d of the power cutoff member 3 and in the screw portion 5b of the rotary shaft 5 during the high torque operation due to the high load operation of the compressor, so that the seat face 5a of the rotary shaft 5 and the seat faces 8a and 8b of the washer 8 undergoes plastic deformation and the continuous operation cannot be made. Also, the seat face 5a of the rotary shaft 5 and the seat faces 8a and 8b of the washer 8 undergo deformation due to the high torque resulting from the seizure of the compressor and the notch portion 3c provided to the power cutoff member 3 cannot cut-off power. Incidentally, reference numerals of the constituent portions of the prior art examples shown in FIGS. 5 to 7 correspond to the reference numerals of similar constituent portions in the embodiment shown in FIGS. 1 and 2.

Another prior art technology that makes portions in the proximity of the rotary shaft compact in the power transmission apparatus for the compressor is known (Japanese Unexamined Patent Publication No. 2001-173759, for example) but the reference does not disclose the present invention.

SUMMARY OF THE INVENTION

In view of the circumstances described above, the invention provides a power transmission apparatus for a compressor capable of securing high fastening strength and having a rotary shaft having a small diameter and, eventually, a power transmission apparatus capable of being fitted to a compressor having a low power loss. More specifically, the invention provides a power transmission apparatus for a normal operation type compressor for a car air conditioner operated from an external power source, such as an engine, through a belt and not having an electromagnetic clutch but having a torque limiter, which power transmission apparatus transmits power from the outside to the compressor through a pulley and has a hub fitted to the rotary shaft of the compressor requiring a small diameter shaft by screw fastening means. The power transmission apparatus can operate the torque limiter at a desired torque and can transmit a high torque even by using a rotary shaft having a small diameter.

According to one aspect of the invention, there is provided a power transmission apparatus (10) comprising a rotary portion (1) to which a turning driving force from a driving source is transmitted and which can rotate; a power cutoff member (3) mechanically connected to the rotary portion (1) and one of the ends of a rotary shaft (5) of a driven apparatus, and cutting off transmission of an excessive torque between the rotary portion and the rotary shaft; and a cap (4) connected to one end of the rotary shaft (5) on one hand and fastened by screw meshing to the power cutoff member (3) on the other hand to transmit power from the power cutoff member (3) to the rotary shaft (3). The rotary portion (1), the power cutoff member (3), the cap (4) and the rotary shaft (5) rotate integrally with one another. The cap (4) has a flange (4h) protruding in a radial direction with respect to an axis of the rotary shaft (5). The torque transmitted from the rotary portion (1) to the rotary shaft (5) is converted to an axial force in the axial direction of the rotary shaft (5) as the cap (4) and the power cutoff member (3) are fastened with each other through screw meshing, and the flange (4h) supports the axial force.

When the power transmission apparatus employs the construction described above, the power cutoff member (torque limiter) and the cap provided to the distal end of the rotary shaft of the driven apparatus are fastened and the torque limiter can be operated at a desired torque. Therefore, the power transmission apparatus can be used for an apparatus having a rotary shaft of a smaller diameter. In the power transmission apparatus having the torque limiter, therefore, the invention can solve the disadvantage such as the collapse of the seat face in the proximity of the rotary shaft due to the axial load and can transmit a high torque. As a result, the invention provides a power transmission apparatus that can be fitted to a compressor having a low power loss.

In the invention, the power transmission apparatus further comprises a hub (2) connected to the rotary portion (1) on one hand and to the power cutoff member (3) on the other hand, and transmitting power from the rotary portion (1) to the power cutoff member (3), and wherein the rotary portion (1), the hub (2) and the power cutoff member (3) rotate integrally with one another.

This discloses a more concrete construction of the power cutoff apparatus according to the invention.

The cap (4) is fastened to the rotary shaft (5) in such a fashion as to encompass the rotary shaft (5). This arrangement further embodies the power transmission apparatus of the invention.

The cap (4) and the rotary shaft (5) are fastened to each other through screw meshing. This arrangement further embodies the fastening structure of the cap (4) and the rotary shaft (5) in the invention.

The flange portion (4h) is formed on the cap (4) on the side opposing the power cutoff member (3). This arrangement further embodies the structure of the cap (4) of the invention.

The power transmission apparatus is connected to a compressor of a car air conditioner as the driven apparatus.

The present invention may be more fully understood from the description of preferred embodiments of the invention, as set forth below, together with the accompanying drawings.

BRIEF DESCRIPTION OF THE DRAWINGS

In the drawings:

FIG. 7 is a partial enlarged sectional view of the fastening portion in FIG. 6.

DESCRIPTION OF THE PREFERRED EMBODIMENTS

Figure 1:
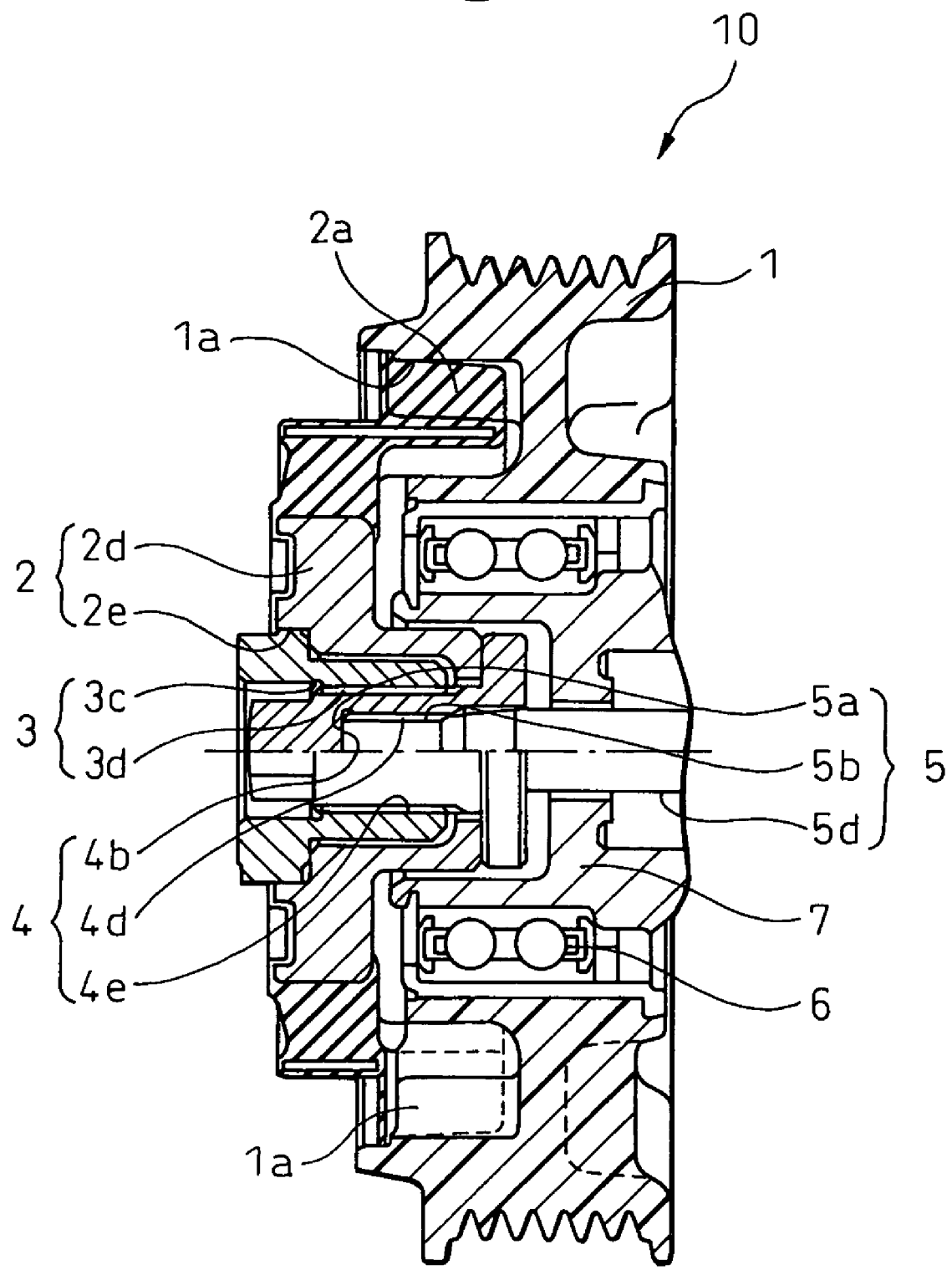
FIG. 1 is a longitudinal sectional view showing a schematic construction of a power transmission apparatus according to a first embodiment of the invention.
Figure 2:
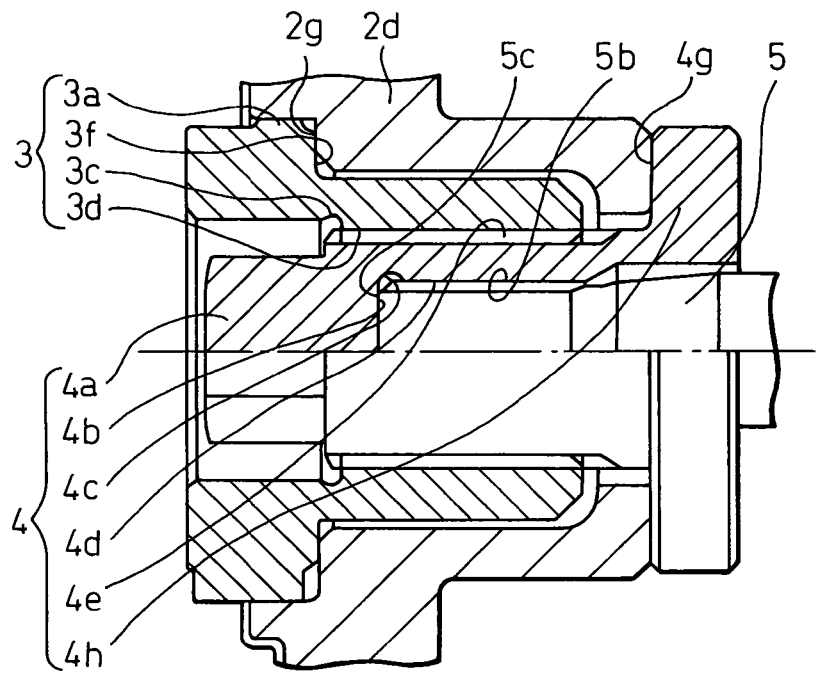
FIG. 2 is a partial enlarged view of a portion near a rotary shaft in FIG. 1.
Figure 5:
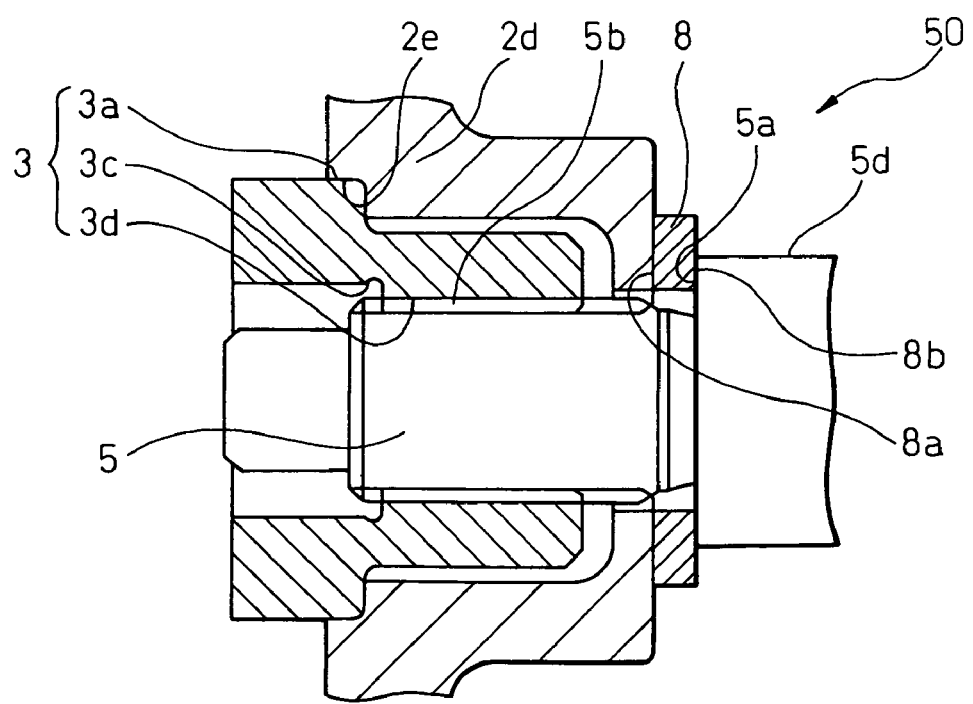
FIG. 5 is a partial longitudinal sectional view of a fastening structure of a power transmission apparatus according to the prior art.
Figure 6:
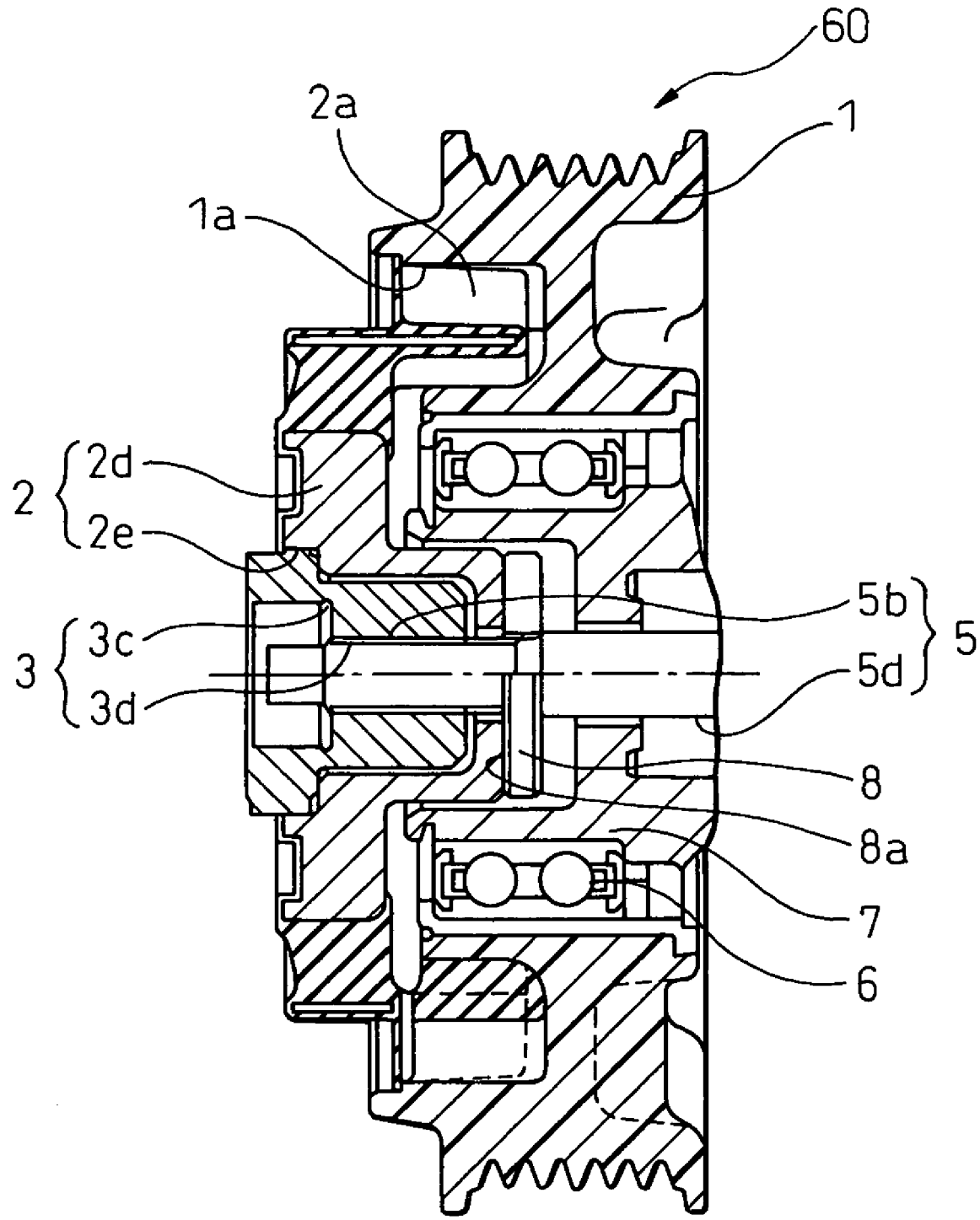
FIG. 6 is a partial longitudinal sectional view showing an example when the fastening structure shown in FIG. 5 is expanded to a rotary shaft having a small diameter.

Preferred embodiments of the invention will be hereinafter explained in detail with reference to the accompanying drawings. FIGS. 1 and 2 schematically show a power transmission apparatus according to the first embodiment of the invention, wherein FIG. 1 is a sectional side view showing a schematic construction of a power transmission apparatus 10 according to the first embodiment and FIG. 2 is a partial enlarged view of a fastening portion of a rotary shaft and a cap in the proximity of the rotary shaft. Referring to FIGS. 1 and 2, the same reference numeral will be used to identify the same constituent element in FIGS. 1 and 2 as that of the prior art example shown in FIGS. 5 to 7.

The power transmission apparatus 10 according to the first embodiment of the invention is used for a car air conditioner and is an apparatus for transmitting the rotating force of an external driving source such as an engine to a compressor of a car air conditioner. The power transmission apparatus 10 has a power cutoff member (torque limiter) 3. In the power transmission apparatus 10, power from the external power source such as the engine is transmitted to a pulley 1 (corresponding to a rotary portion) through a belt not shown in the drawing. Power is transmitted to an inner hub 2d of a hub 2 as a fitting portion 2a formed of an elastic member provided to an outer periphery of the hub 2 meshes with a fitting portion 1a of the pulley. The pulley 1 is supported by a casing 7 of the compressor, not shown, through a bearing 6 in such a manner as to be capable of rotating. Power is further transmitted from the hub 2 to the power cutoff member 3 disposed inside the hub 2, then from the power cutoff member 3 to the cap 4 meshing with the power cutoff member 3, and thereafter to the rotary shaft 5 of the compressor meshing with the cap 4.

FIG. 2 is an enlarged view of the fastening portion shown in FIG. 1. The cap 4 of the metal shown in FIG. 2 is fitted to the distal end (one of the ends) of the rotary shaft 5 having a small diameter in the construction of the embodiment described above. The inner hub 2d of the hub 2 and the power cutoff member 3 are fitted through faucet joint of a hexagonal shape or a rectangular shape at the fitting portion 2e of the inner hub 2d and the fitting portion 3a of the power cutoff member, and transmit power from the hub 2 to the power cutoff member 3 owing to this construction. A first screw portion 4e is formed around an outer peripheral portion of the cap 4 and meshes with the screw portion 3d of the power cutoff member 3. A second screw portion 4d formed on the inner peripheral side of the cap 4 meshes with a screw portion 5 on the outer peripheral side of the rotary shaft 5. When the screw portion 5b of the rotary shaft 5 is screwed into the second screw portion 4d, an end face 5c at the distal end of the rotary shaft comes into touch with a seat face (bearing surface) 4b formed inside the cap 4 as shown in FIG. 2, thereby inhibiting further screw-in of the second screw portion 4d.

Next, the operation of the power transmission apparatus 10 when an excessive torque acts thereon will be explained. The torque (power) is transmitted from the hub 2 to the power cutoff member 3 through the faucet joint portion, to the cap 4 through the respective screw portions 3d and 4e of the power cutoff member 3 and the cap 4 and to the rotary shaft 5 through the respective screw portions 4d, 5b of the cap 4 and the rotary shaft 5. Power transmission between the cap 4 and the rotary shaft 5 is made through the frictional force due to the axial force between the end face 5a and the seat face 4b resulting from the contact of the end face 5a of the distal end of the rotary shaft 5 and the seat face 4b of the cap 4 in addition to the screw portions 4b, 5b.

In the torque transmission between the power cutoff member 3 and the cap 4, on the other hand, power is converted to the axial force as the seat face 3f of the power cutoff member 3 comes into touch with the seat surface (bearing surface) 2g of the inner hub 2d. The cap 4 has a disc-like flange portion 4h that is disposed on the opposing side to the power transmission member, and the flange portion 4h protrudes in a radial direction with respect to the axis of the rotary shaft 5. The axial force acting on the inner hub 2d on the seat face 2g is borne by the seat face (bearing surface) 4g on the inner hub side in the axial direction of the flange portion 4h as can be appreciated from FIG. 2. In the power transmission apparatus 60 of the prior art described already, this axial force is received by the seat face (bearing surface) 5a through the washer 8. The axial force transmitted from the inner hub 2d to the power cutoff member 3 through the seat face (bearing surface) 3f is borne by the first screw portion 4e of the cap 4 through the screw portion 3d. Furthermore, the axial force is transmitted to the rotary shaft 5 through the contact of the seat face 4b of the cap 4 with the end face 5c of the rotary shaft 5 and through fastening between the second screw portion 4d of the cap 4 and the screw portion 5b of the rotary shaft 5 and, at the same time, the torque is transmitted.

The power cutoff member 3 has a notch portion 3c having a reduced section and a notch. Therefore, the screw portions 3d and 4e are fastened by the excessive torque that occurs when the compressor undergoes seizure, and the notch portion 3c provided to the power cutoff member 3 undergoes breakage to cut-off power and to avoid the problem that the belt of the car is damaged. In this instance, the contact surface of the seat surface 4g as the axial force bearing surface of the flange portion 4h of the cap 4 and the inner hub 2d can form a sufficient area, as shown in FIG. 2, and can suppress the surface pressure acting on the seat face 4g to a sufficiently low level. Though the axial force acting on the seat faces 4b and 5c increases, it is easy to set the strength of the cap 4 and the rotary shaft 5 against this axial force to be greater than the breaking strength of the notch portion 3c. According to such a construction, it becomes possible to avoid the problem of the prior art described already in that the seat face 5a of the rotary shaft 5 and the seat faces 8a and 8b of the washer 8 undergo plastic deformation such as sinking and consequently, the torque limiter does not operate. Furthermore, this construction can eliminate the washer 8 that has been necessary in the prior art example.

Figure 3:
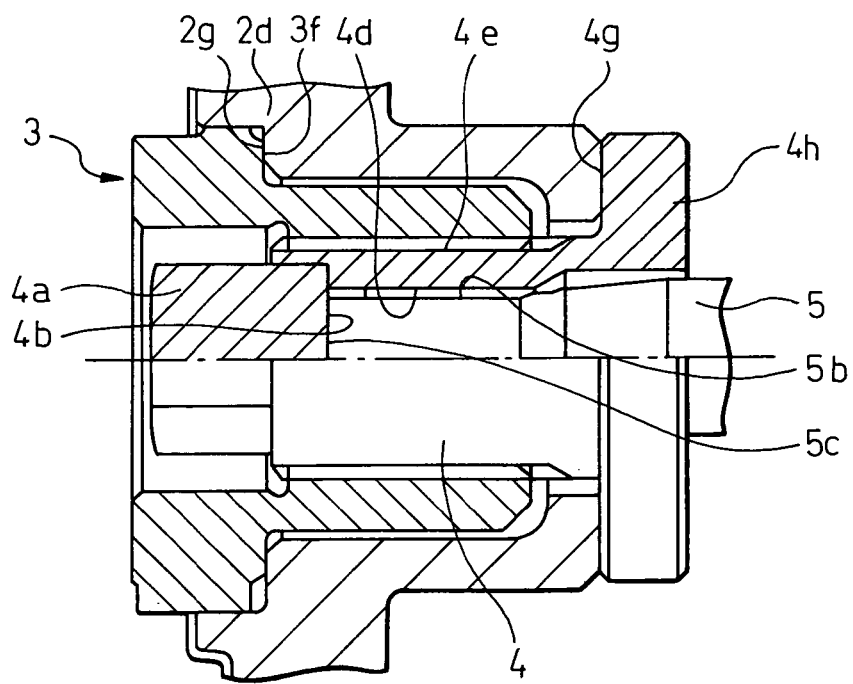
FIG. 3 is an enlarged sectional view of a portion near a rotary shaft fastening portion of a power transmission apparatus according to a second embodiment of the invention.

FIG. 3 is a partial enlarged sectional view of a portion in the proximity of the rotary shaft fastening portion of a power transmission apparatus according to the second embodiment of the invention. When the cap structure shown in FIG. 2 is employed in the first embodiment described above, the escape portion 4c shown in FIG. 2 is necessary for processing the screw portion 4e, but it is also possible to form a portion (head portion) 4a having a tool portion disposed at the cap 4 into a separate component and to couple it with the cap 4 by means such as push-in, welding, etc. The rest of the constructions of this embodiment are the same as those of the first embodiment. Therefore, an explanation will be omitted.

Figure 4:
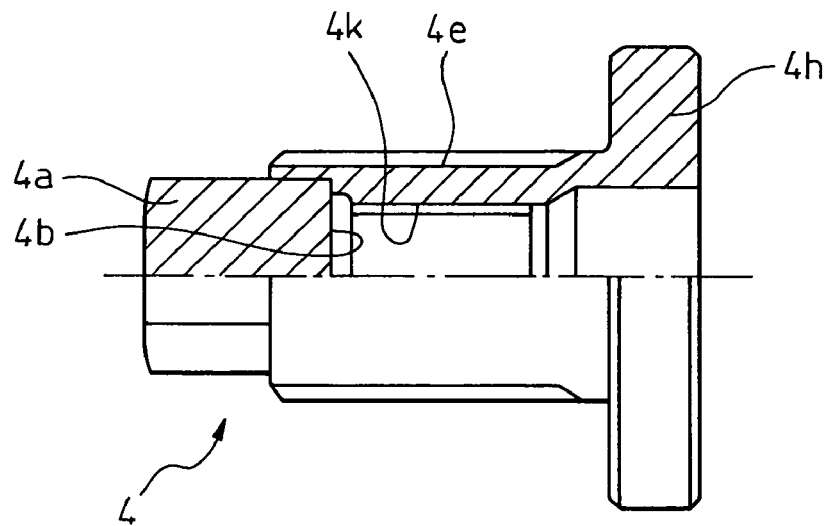
FIG. 4 is an enlarged sectional view of a cap of a modified embodiment of the second embodiment of the invention.

FIG. 4 shows an enlarged sectional view of a cap in a modified example of the second embodiment. In the cap 4 shown in FIG. 4, the first screw portion 4e capable of coupling with the screw portion 3d of the power cutoff member 3 is formed around the cap outer peripheral portion but means for coupling with the rotary shaft 5 of the compressor inside the cap 4 may be a spline structure 4k in place of the screw in this embodiment. The construction of this embodiment may be applied to the first embodiment.

Referring to FIGS. 3 and 4, like reference numerals are used to identify like constituent elements as in the first embodiment shown in FIGS. 1 and 2.

Next, the effects and operations of the embodiments described above will be explained.

The following effects can be expected by the power transmission apparatus according to the first embodiment of the invention.

In the power transmission apparatus having the power cutoff member (torque limiter) installed inside the hub, the torque limiter can be operated at a desired torque by arranging the cap having the flange at the distal end portion of the rotary shaft of the compressor.

Therefore, in the power transmission apparatus having the torque limiter, it becomes possible to eliminate the problems such as sinking of the seat face in the proximity of the rotary shaft owing to the axial load, to transmit the high torque without affecting the power cutoff performance of the power cutoff member and eventually to fit the power transmission apparatus to a compressor having a low power loss.

The power transmission apparatus according to the second embodiment of the invention can provide the following effect in addition to the effects of the first embodiment.

Namely, processing of the screw portion of the cap becomes easier.

The power transmission apparatus of the modified embodiment of the second embodiment of the invention can provide the fastening structure of the cap and the rotary shaft of the compressor that can expect the same effects as those of the first embodiment.

The embodiments given above represent the example where the invention is used as the power transmission apparatus for the compressor of the car air conditioner but the invention may be used for other applications. In other words, the application of the invention is not limited to the car air conditioner.

In the embodiments described above or shown in the accompanying drawings, power of the driving source is transmitted through the belt and the pulley but the invention is not limited thereto. Namely, power may be transmitted through other mechanisms such as gears.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A power transmission apparatus comprising:
   a rotary portion to which turning driving force from a driving source is transmitted and which can rotate;
   a power cutoff member mechanically connected to said rotary portion and an end of a rotary shaft of a driven apparatus, and cutting off transmission of an excessive torque between said rotary portion and said rotary shaft; and
   a cap connected to said one end of said rotary shaft and fastened by screw meshing to said power cutoff member to transmit power from said power cutoff member to said rotary shaft;
   wherein said rotary portion, said power cutoff member, said cap and said rotary shaft rotate integrally with one another;
   said cap has a flange protruding in a radial direction with respect to an axis of said rotary shaft; and the torque transmitted from said rotary portion to said rotary shaft is converted to an axial force in the axial direction of said rotary shaft as said cap and said power cutoff member are fastened with each other through screw meshing, and said flange portion supports said axial force.

2. A power transmission apparatus as defined in claim 1, which member, and wherein said rotary portion, said hub and said power cutoff member rotate integrally with one another.

3. A power transmission apparatus as defined in claim 1, wherein said cap is fastened to said rotary shaft in such a fashion as to encompass said rotary shaft.

4. A power transmission apparatus as defined in claim 1, wherein said cap and said rotary shaft are fastened to each other through screw meshing.

5. A power transmission apparatus as defined in claim 1, wherein said flange portion is formed on said cap on the side opposing said power cutoff member.

6. A power transmission apparatus as defined in claim 1, which is connected to a compressor of a car air conditioner as said driven apparatus.

7. A power transmission apparatus including:

a rotary portion to which turning driving force from a driving source is transmitted and which can rotate;

a seat face which is mechanically connected to said rotary portion and movement of which is restricted in an axial direction of the rotary portion;

a screw portion mechanically connected to said seat face and moving in an axial direction when a torque transmitted from said rotary portion to a rotary shaft of a driven apparatus becomes excessive; and a power cutoff member disposed between said seat face and said screw portion;

said power transmission apparatus comprising:

a cap connected to said rotary shaft in such a fashion as to be capable of rotating integrally;

a flange protruding disposed in an outer peripheral portion of said cap; and a cap side screw portion disposed in an outer peripheral portion of said cap;

said seat face being prevented by said flange portion either directly or indirectly from moving in the axial direction;

said screw portion coupled with said cap side screw portion through screw meshing;

said screw meshing generating an axial force by a torque transmitted from said rotary portion to said rotary shaft.

8. A power transmission apparatus as defined in claim 7, wherein said seat face directly or indirectly pushes said flange portion by the axial force generated by said screw coupling.

* * * * *